(12) United States Patent
Myszka et al.

(10) Patent No.: US 6,516,945 B2
(45) Date of Patent: Feb. 11, 2003

(54) DEVICE FOR LOCKING A MEDIA DISC TO A RETAINING HUB

(75) Inventors: Kevin E. Myszka, Kent, OH (US); James M. Byrne, Massillon, OH (US)

(73) Assignee: Nexpak Corporation, North Canton, OH (US)

( * ) Notice: Subject to any disclaimer, the term of this patent is extended or adjusted under 35 U.S.C. 154(b) by 0 days.

(21) Appl. No.: 09/769,033

(22) Filed: Jan. 24, 2001

(65) Prior Publication Data

US 2002/0096442 A1 Jul. 25, 2002

(51) Int. Cl.[7] .............................................. B65D 85/57
(52) U.S. Cl. ...................... 206/308.2; 206/310; 206/807
(58) Field of Search .............................. 206/310, 308.2, 206/309, 308.1, 303, 493, 807; D6/632, 634, 635, 407

(56) References Cited

U.S. PATENT DOCUMENTS

| | | |
|---|---|---|
| 3,862,555 A | 1/1975 | Wirth |
| 3,927,765 A | 12/1975 | Beal |
| 4,425,999 A * | 1/1984 | MacDonald et al. ......... 206/1.5 |
| 4,499,994 A * | 2/1985 | Rentch ....................... 206/0.8 |
| 4,635,797 A | 1/1987 | Bankier |
| 4,658,955 A * | 4/1987 | Eichner ....................... 206/1.5 |
| 4,682,690 A | 7/1987 | Tiffany |
| 4,709,813 A * | 12/1987 | Wildt ......................... 206/1.5 |
| 4,750,618 A * | 6/1988 | Schubert ...................... 206/1.5 |
| 5,085,318 A | 2/1992 | Leverick |
| 5,385,231 A | 1/1995 | Nowotny |
| 5,462,159 A * | 10/1995 | Roth et al. ............... 206/308.1 |
| 5,517,178 A | 5/1996 | Rodrigues |
| 5,894,924 A * | 4/1999 | Koch ......................... 206/307 |
| 5,896,985 A * | 4/1999 | Nakasuji ..................... 206/1.5 |
| 6,016,909 A | 1/2000 | Chang |
| 6,065,593 A | 5/2000 | Howerton et al. |
| 6,102,200 A * | 8/2000 | Dressen et al. .......... 206/308.2 |
| 6,283,280 B1 * | 9/2001 | Wong et al. ............. 206/308.1 |
| 6,382,413 B1 | 5/2002 | Nakamura et al. |

* cited by examiner

Primary Examiner—Mickey Yu
Assistant Examiner—Jila M Mohandesi
(74) Attorney, Agent, or Firm—Sand & Sebolt

(57) ABSTRACT

A locking device for a disc retaining hub includes a base and a head that lock together over the hub to lock a disc on the hub until a portion of the locking device is destroyed. The head or the base of the locking device includes locking fingers that allow the head and base to lock together in a one-way snap fit connection. The locking mechanism may also cooperate with the disc retaining hub to lock itself to the hub. The locking mechanism prevents the disc from being removed from the hub until the locking mechanism is destroyed by the user.

18 Claims, 12 Drawing Sheets

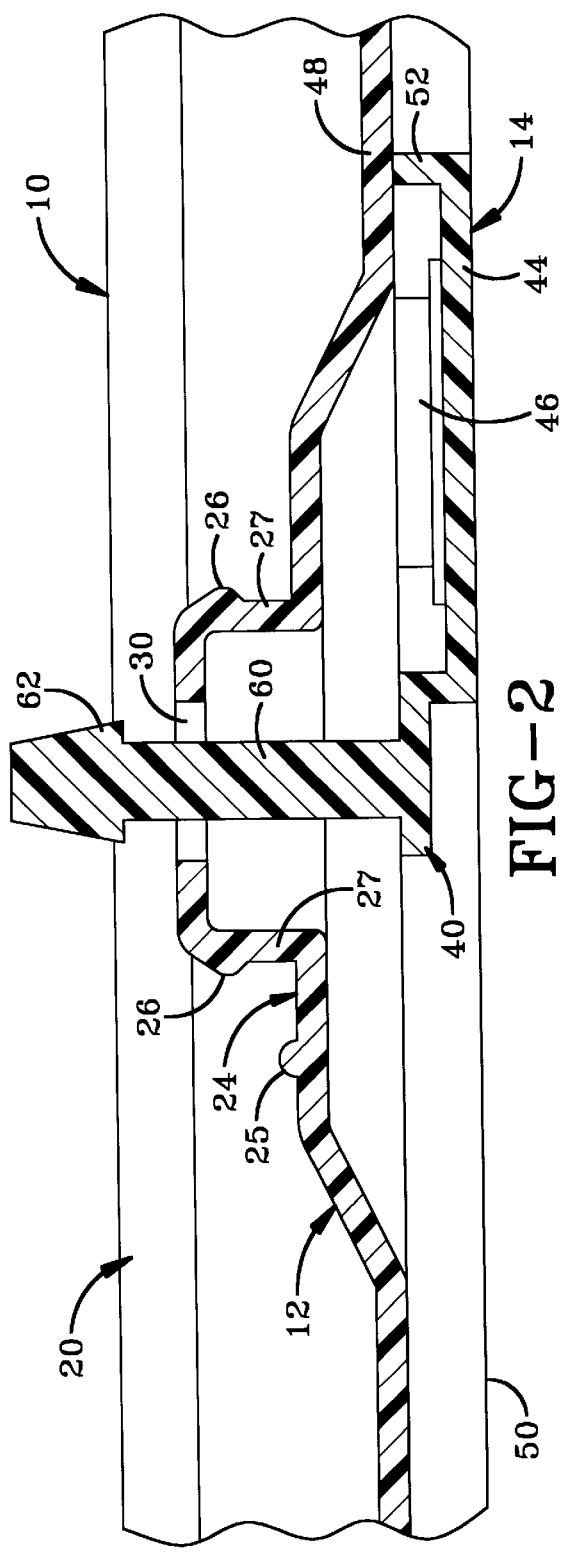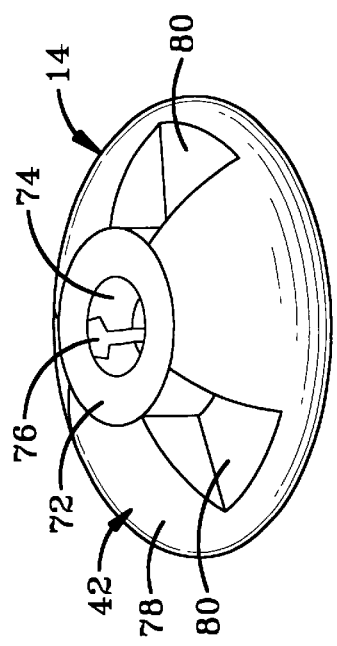

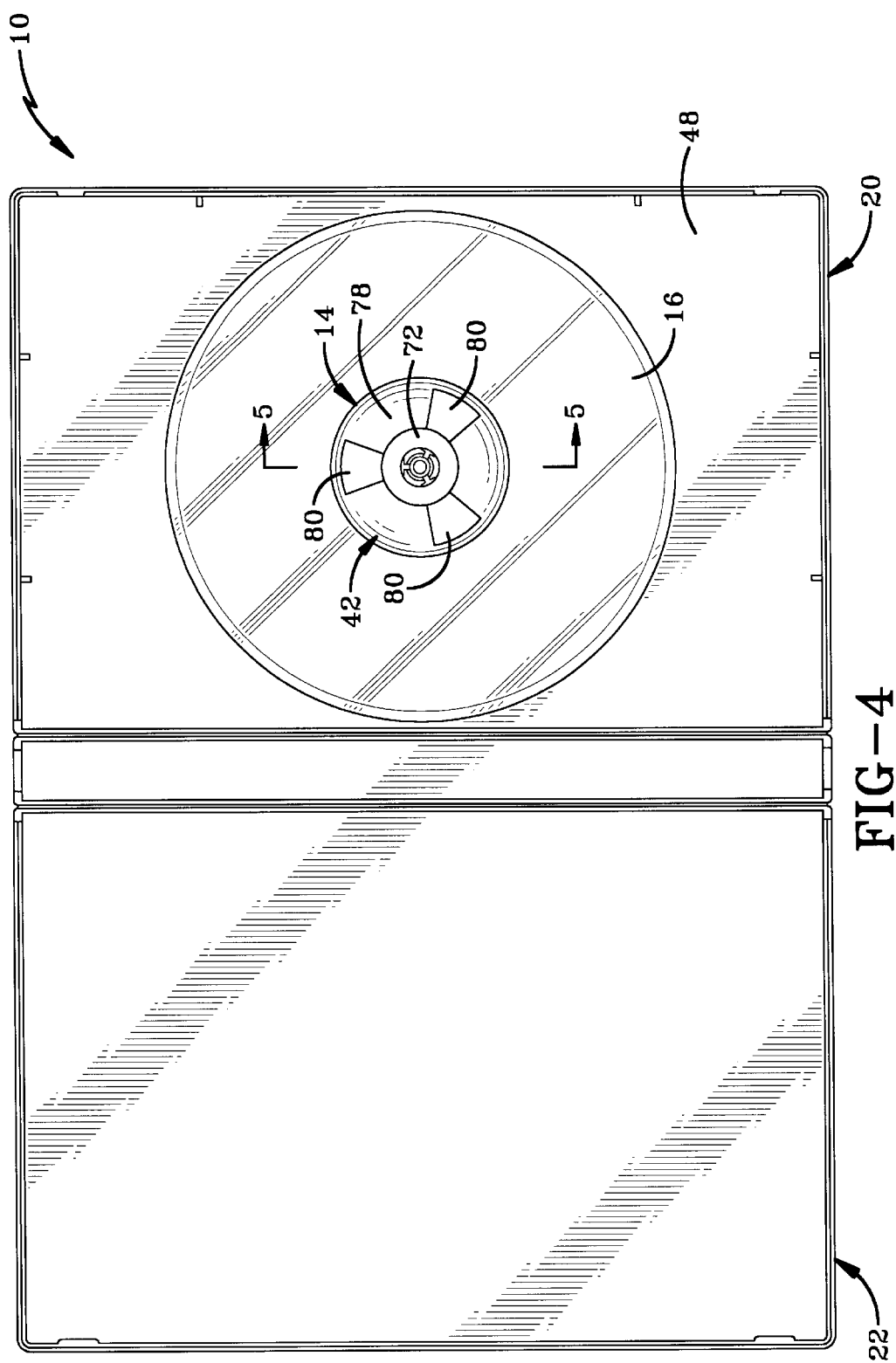

DEVICE FOR LOCKING A MEDIA DISC TO A RETAINING HUB

BACKGROUND OF THE INVENTION

1. Technical Field

The present invention generally relates to media storage containers and, more particularly, to a media storage container that prevents the item of recorded media from being removed from the container until the user destroys a portion of the container. Specifically, the present invention relates to a media storage container having a hub that receives a disc-shaped item of recorded media. A locking member cooperates with the hub to prevent the disc from being removed from the hub. The user must destroy the locking member before removing the disc from the hub.

2. Background Information

Different media formats are sold in the form of discs. Examples are CDs and DVDs. These discs are stored in media storage containers that typically have a hub on which the disc is received. The hubs include holding fingers that prevent the disc from falling off of the hub during normal use and handling. The storage containers are shrink wrapped when displayed in retail environments.

A problem with these storage containers is that shoplifters have devised ways of removing the discs from the containers in the retail environment even when the containers are locked with an external lock. The removal of the disc allows the shoplifter to leave the store without activating alarms that are triggered by an electronic article surveillance (EAS) tag positioned in the storage container. One way of removing the disc from a container is to strike the front of the container against a surface until the disc is shaken off of the hub. The shoplifter then slits the shrink wrap, forces an end of the box open, and removes the disc from the container. The art desires a hub mechanism that will retain the disc on the hub even when the. hub is subjected to sharp impact forces. The art also desires that the hub easily release the disc after the consumer purchases the disc and the container.

SUMMARY OF THE INVENTION

The invention provides a storage container for a disc-shaped item of recorded media wherein the disc is held on a hub within the container. A device cooperates with the hub to prevent the disc from being removed from the hub. The user of the device destroys the device and discards it when first removing the disc from the hub. The disc may then be placed onto and removed from the hub.

The invention provides a locking member that snap fits over the hub and discs to prevent the disc from being removed from the hub. The user cuts portions of the locking member to allow it to be removed from the hub. The user may then use the hub in its normal capacity.

BRIEF DESCRIPTION OF THE DRAWINGS

FIG. 2 is a sectional view taken along line 2—2 of FIG. 1.

FIG. 3 is a perspective view of a second portion of the locking member that cooperates with the first portion of the locking member to lock an item of recorded media in the base of the container.

FIG. 4 is a top plan view showing a disc-shaped item of recorded media locked to the base of the container.

Similar numbers refer to similar parts throughout the application.

DETAILED DESCRIPTION OF THE DRAWINGS

Figure 1:
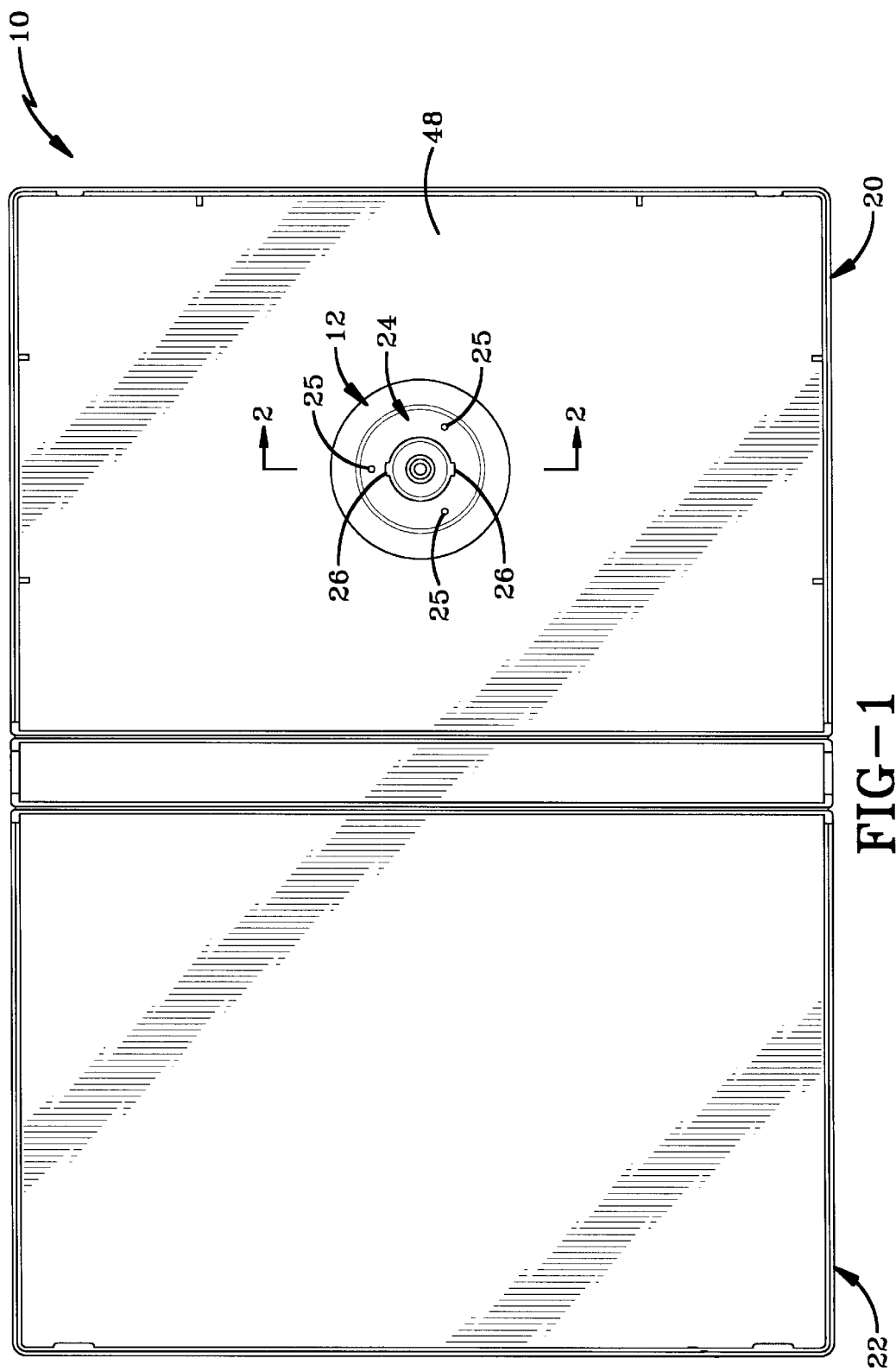
FIG. 1 is a top plan view of a storage container having a hub with a portion of the locking member connected to the base of the container.

A storage container for a disc-shaped item of recorded media is indicated generally by the numeral 10 in the accompanying drawings. Container 10 includes a hub 12 configured to cooperate with the locking device 14 of the present invention to securely retain an item of recorded media in container 10 until the consumer removes locking device 14 from container 10. Locking device 14 may not be removed from container 10 until at least a portion of locking device 14 is destroyed.

Container 10 includes a base 20 and a lid 22 that is movable between open and closed positions. In the closed position, lid 22 and base 20 cooperate to form a storage chamber inside of container 10. Hub 12 includes a support surface 24 that engages the lower surface of a disc 16 that contains recorded media. Support surface 24 may support disc 16 above the lower surface of container 10. In the embodiment of the invention depicted in the drawings, support surface 24 includes a plurality of raised nubs 25 that minimize friction between disc 16 and support surface 24. Hub 12 further includes protrusions 26 that are positioned over the upper surface of disc 16 when disc 16 is held by hub 12. Protrusions 26 hold disc 16 on hub 12 in a manner that allows the user to remove disc 16 from hub 12 and replace disc 16 on hub 12. Protrusions 26 and/or the sidewall 27 of hub 12 are thus somewhat resilient to allow for the repetitious removal and replacement of disc 16. In the embodiment of the invention depicted in the drawings, protrusions 26 are oppositely disposed and extend outwardly from a substantially cylindrical sidewall. In other embodiments of the invention, protrusions 26 may be disposed in different numbers than the two protrusions depicted in the drawings. In other embodiments, protrusions 26 may be disposed at the end of resilient fingers that are cantilevered from support surface 24. The resilient fingers may push radially outwardly against the inner edge of disc 16.

Figure 5:
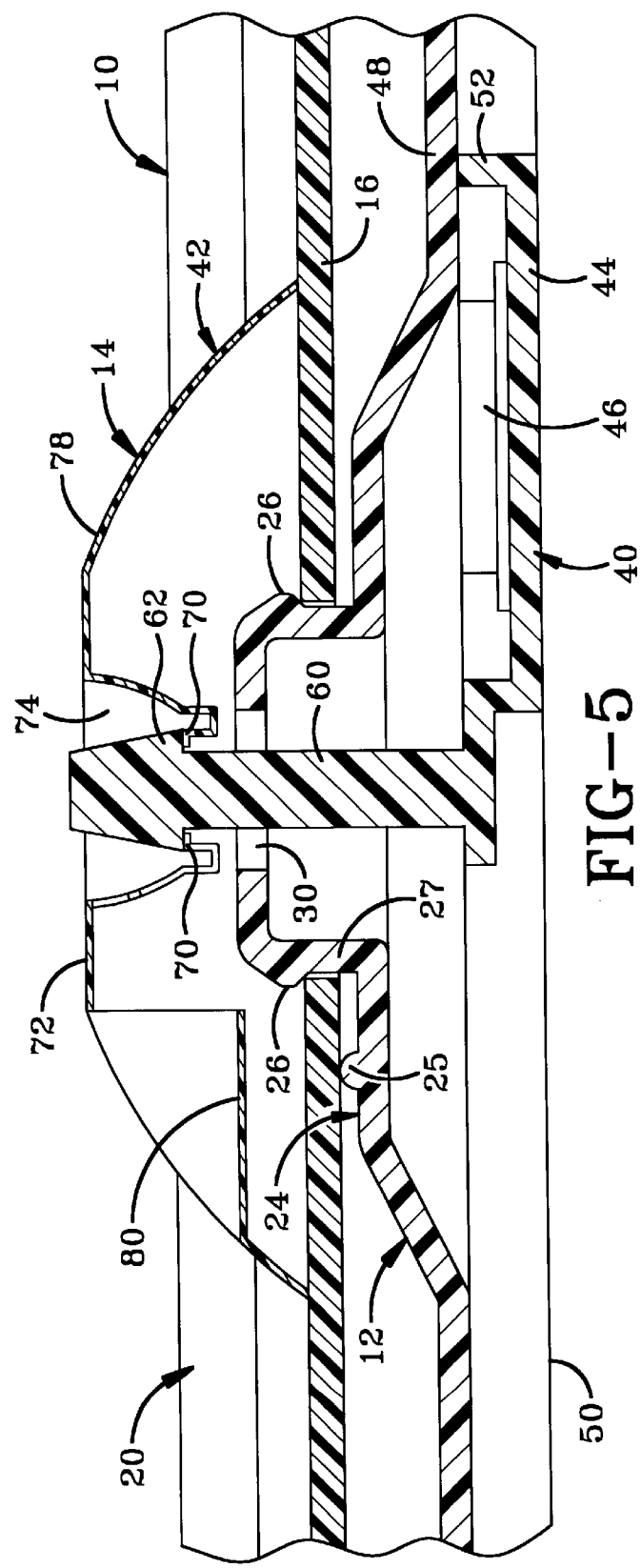
FIG. 5 is a sectional view taken along line 5—5 of FIG. 4.

Hub 12 further defines an opening 30 configured to receive a portion of locking device 14. Locking device 14 generally includes a base 40 and a head 42. Head 42 is configured to lock to base 40 in a manner that prevents head 42 from being removed from base 40 once head 42 is in the locked position. The locked position of head 42 is depicted in FIGS. 4 and 5. One of base 40 and head 42 is configured to pass through a portion of hub 12 before head 42 is locked to base 40. Once locked to base 40, head 42 prevents the user from removing disc 16 from hub 12 as depicted in FIG. 5. Before the user may remove disc 16, the user must destroy a portion of either base 40 or head 42. For instance, the user may cut head 42 away from base 40 in order to remove head 42 and access disc 16.

Base 40 includes a tray 44 sized to hold an electronic article surveillance tag (EAS tag) 46. Tray 44 is positioned underneath the bottom wall 48 of base 20 of container 10. Base 40 and tray 44 are hidden from view by the literature sheet or the outer sheathing 50 of container 10. EAS tag 46 may be adhesively connected to tray 44 or may be loosely disposed in tray 44. Tray 44 may also have a plurality of upstanding walls 52 configured to retain EAS tag 46. In other embodiments, EAS tag 46 may be carried by head 42.

Base 40 also includes a post 60 configured to extend up through hub 12. Post 60 is configured to lockingly receive head 42. Post 60 includes at least one locking finger 62 that engages head 42 in a locked position. Post 60 extends up through opening 30 of hub 12 so that head 42 is positioned over hub 12 when head 42 is in the locked position.

Head 42 includes at least one ledge or locking finger 70 configured to cooperate with locking fingers 62 to lock head 42 to base 40 as depicted in FIG. 5. In this embodiment of the invention, post 60 includes a single continuous locking finger 62 that extends circumferentially about post 60. Locking fingers 70 are disposed below the upper surface 72 of head 42 so that a shoplifter cannot easily access locking fingers 70.

Head 42 has a diameter large enough to cover all portions of hub 12 that extend through the center hole of disc 16. The lower wall of head 42 may engage the upper surface of disc 16. Head 42 is configured to allow a user to cut through upper wall 72 with a pair of household scissors or a knife in order to loosen head 42 and to remove it from post 40. Once head 42 is removed, the user may remove disc 16. If desired, the user may cut post 60 to remove the head of post 60. Tray 44 remains loosely disposed below wall 48.

As described above, locking fingers 70 of head 42 are disposed below upper wall 72 so that the shoplifter cannot easily manipulate locking fingers 70. Head 42 is formed with a downwardly extending wall 74 that defines openings 76. Locking fingers 70 extend inwardly from the lower portions of wall 74 between openings 76. The downwardly projecting outer wall 78 of head 42 defines three shelves 80 that provide an accessible region for the user to attack head 42 with scissors when removing head 42 from base 40. Outer wall 78 is generally dome-shaped. The dome provides strength to head 42 while allowing head 42 to be configured to be destroyed with scissors.

Figure 6:
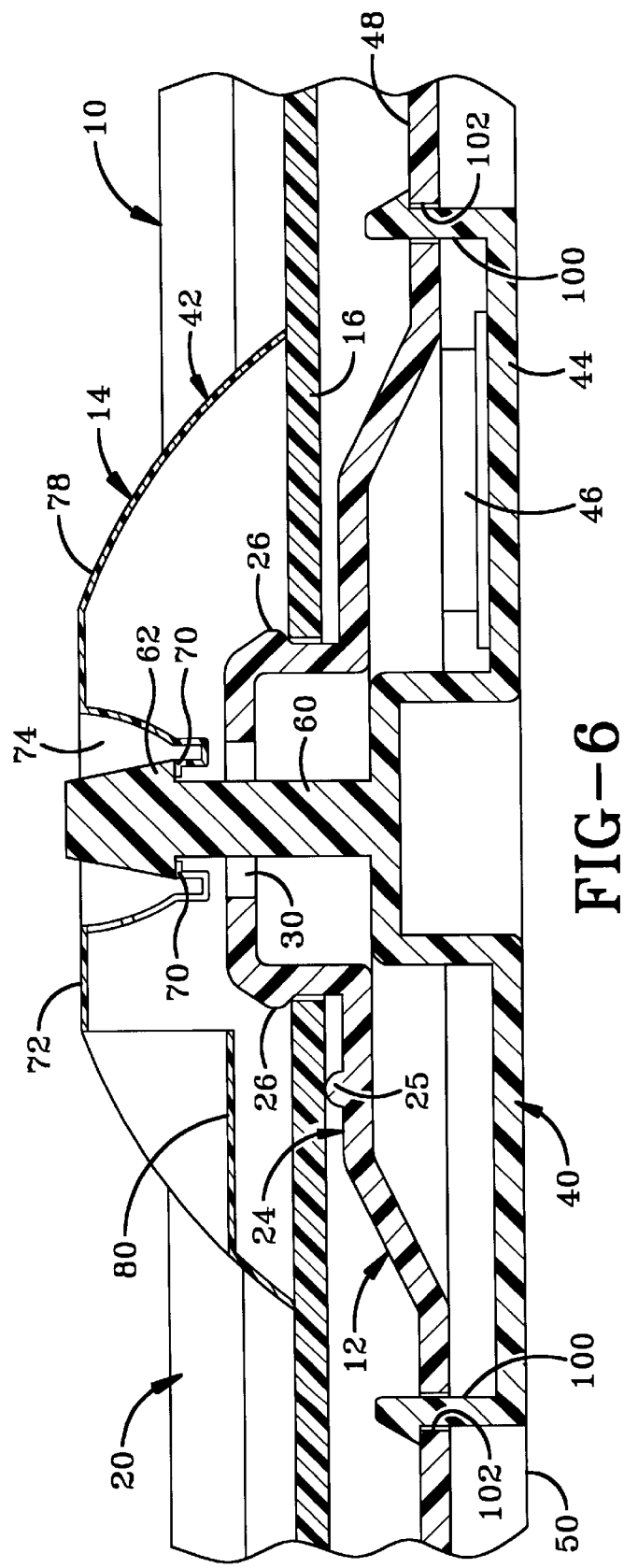
FIG. 6 is a view similar to FIG. 5 showing an alternative embodiment of the invention wherein the first member of the locking device is snap fit to the base of the container.

An alternative version of the invention is depicted in FIG. 6. In this embodiment, base 40 includes locking fingers 100 that connect base 40 to base 20. In the embodiment depicted in FIG. 6, locking fingers 100 extend through openings 102 defined by bottom wall 48 of base 20. Fingers 100 are forced through openings 102 in a one-way snap fit connection to prevent base 40 from becoming loose after head 42 is removed.

Figure 7:
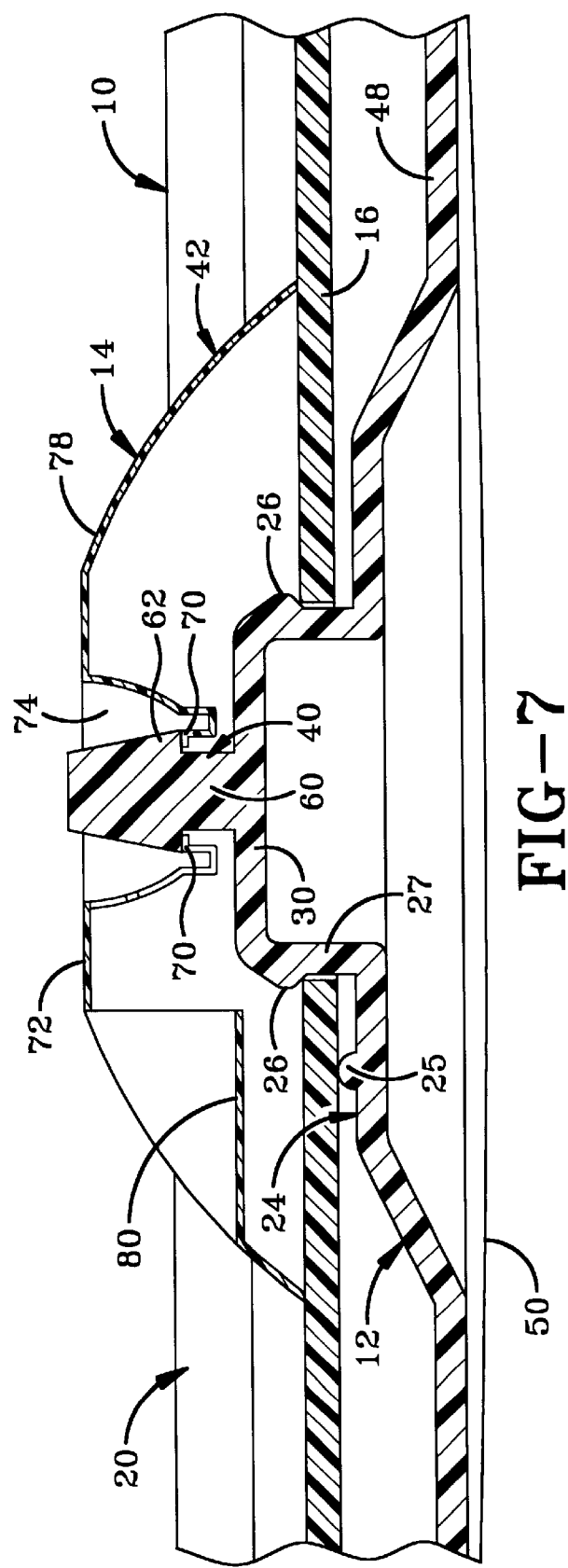
FIG. 7 is a view similar to FIG. 5 showing an alternative embodiment wherein the first member of the locking device is integrally formed with the hub of the container.
Figure 8:
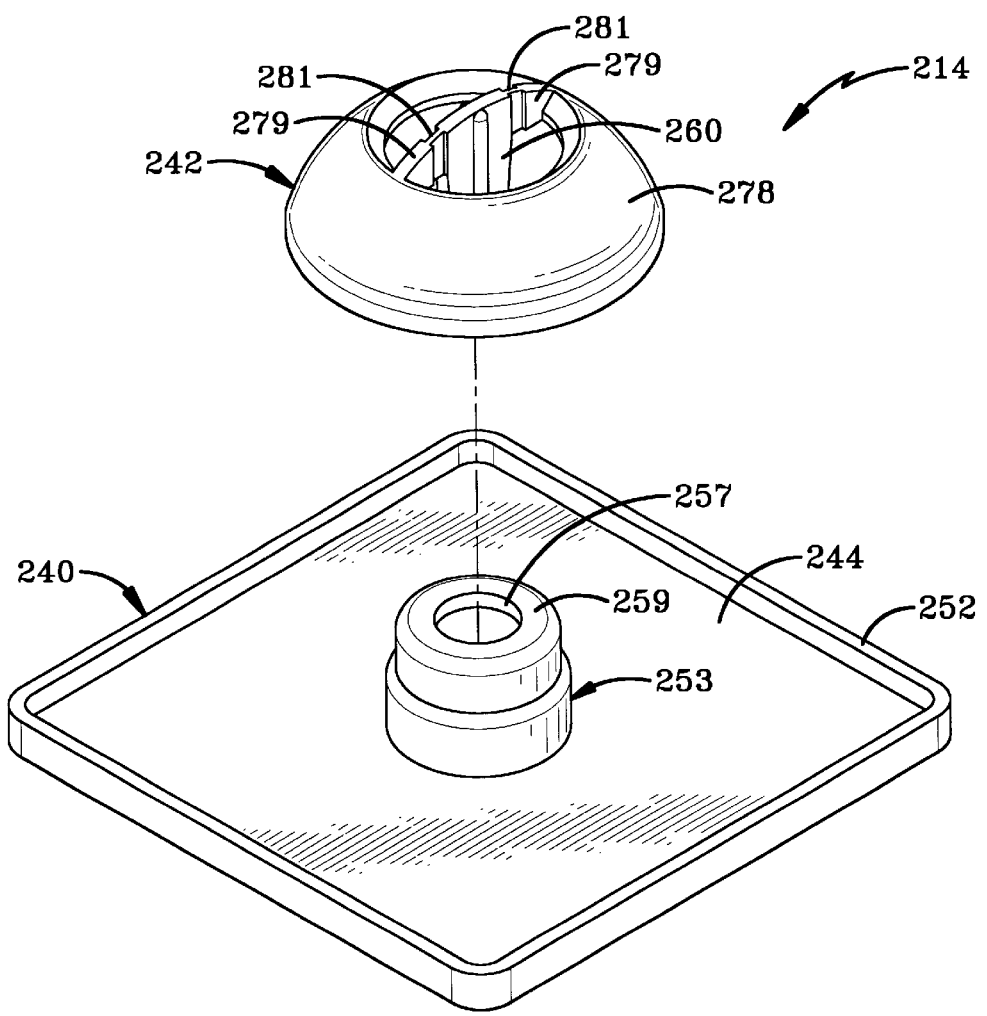
FIG. 8 is an exploded perspective view of an alternative embodiment of the locking device of the invention.
Figure 9:
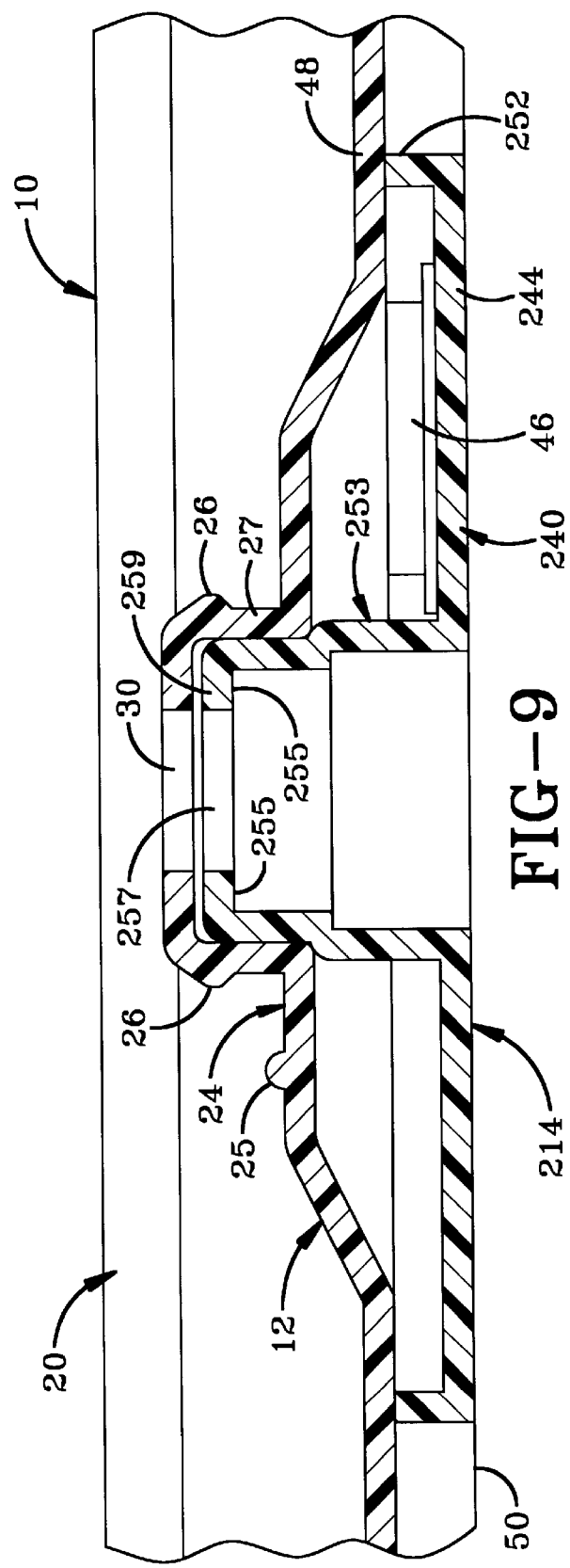
FIG. 9 is a sectional view through a hub showing the first member of the locking device engaged with the hub.
Figure 10:
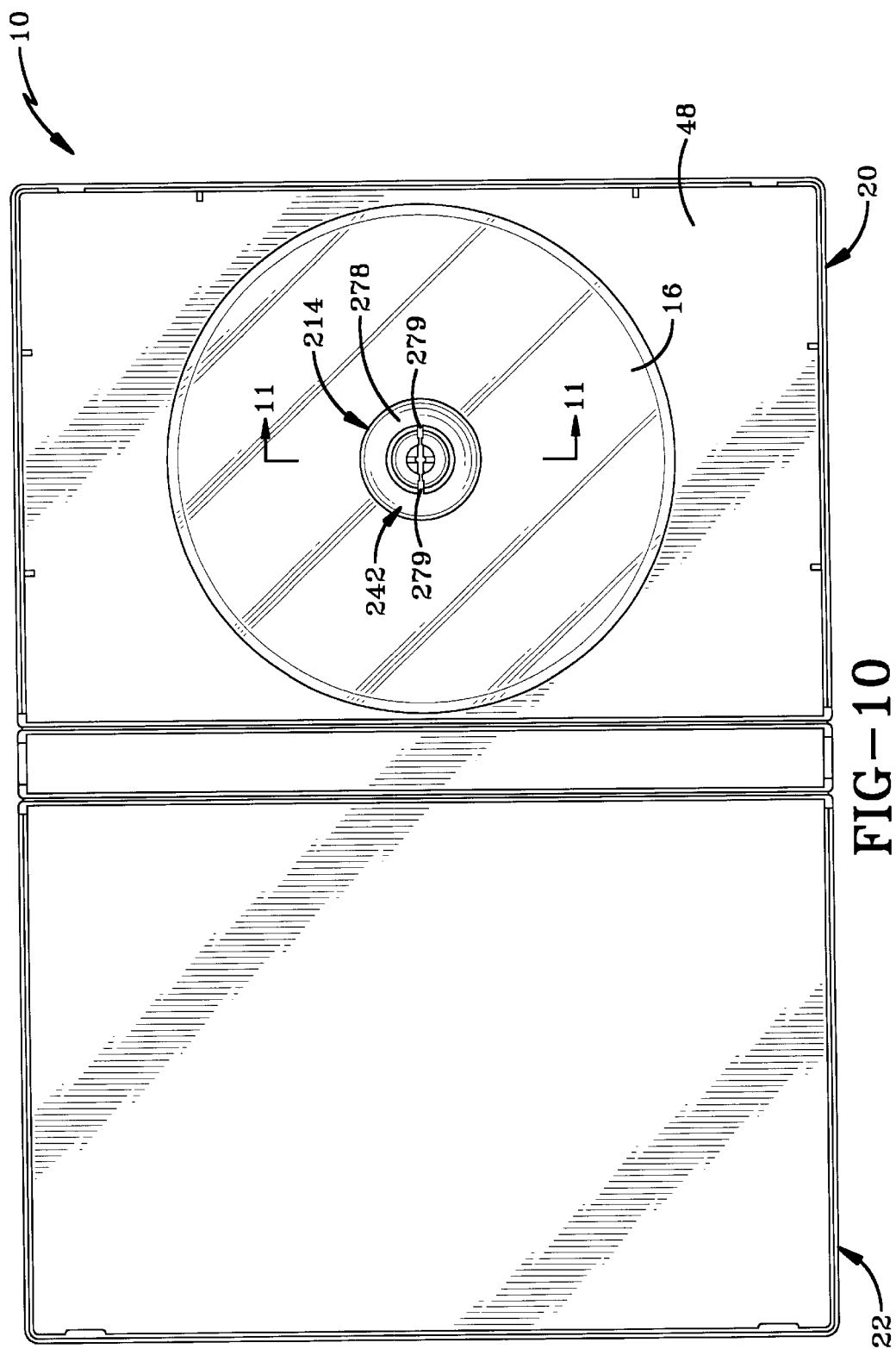
FIG. 10 is a top plan view of a storage container having a disc-shaped item of recorded media locked to the hub of the container.

An alternative embodiment is depicted in FIG. 7 wherein post 60 is integrally formed with hub 12 such that base 40 is an integral part of hub 12.

An alternative embodiment of the invention is depicted in FIGS. 8–11. In FIGS. 8–11, the locking mechanism is indicated generally by the numeral 214. The elements of the storage container and the disc are labeled with the same numbers used above. Locking mechanism 214 performs the same function as locking mechanism 14 described above.

Locking mechanism 214 includes a base 240 and a head 242 that cooperate to lock disc 16 on hub 12 until the user destroys a portion of locking mechanism 214 to remove it from container 10. Locking mechanism 214 is different than locking mechanism 14 in that the post 260 carrying the locking fingers 262 is connected to head 242 instead of base 240.

Base 240 includes a tray 244 configured to hold EAS tag 46 below bottom wall 48 of base 20. EAS tag 46 may be mounted to tray 244 with adhesive or tray 244 may include walls 252 configured to hold EAS tag 46 on tray 244. Base 240 also includes a secondary post 253 that defines a locking finger or ledge 255. Ledge 255 is configured to cooperate with locking fingers 262 to lock head 242 to base 240 when locking mechanism 214 is locked over hub 12. In the embodiment of the invention depicted in the drawings, secondary post 253 is configured to be snugly received inside hub 12 to position ledge 255 immediately below opening 30. This configuration allows post 260 to be shorter than if ledge 255 were positioned at the same level as support surface 24. Ledge 255 is positioned closely adjacent an opening 257 defined by an upper wall 259 of secondary post 253. The outer surface of secondary post 253 may be designed to frictionally engage the inner surface of wall 27 of hub 12. The frictional engagement strengthens hub 12 and helps to keep disc 16 on hub 12 during shipping. The frictional engagement also prevents base 240 from rattling against base 20.

As noted above, post 260 is connected to head 242. Locking fingers 262 extend radially outwardly and axially upwardly with respect to post 260 when head 242 is connected to base 240. Each locking finger 262 is resilient and may be bent radially inwardly when its outwardly facing angled surface engages a wall such as upper wall 259 of secondary post 253. The angled configuration of locking fingers 262 prevent post 260 from being pulled out of opening 257 once locking fingers 262 have been pushed through opening 257 to engage ledge 255.

Post 260 is connected to the dome-shaped outer wall 278 of head 242 by a pair of bridges 279. Bridges 279 may be oppositely disposed as depicted in the drawings. Although two bridges 279 are depicted, different number of bridges 279 may be included to provide more support and more security to locking mechanism 214. Bridges 279 provide security because each bridge 279 must be destroyed before head 242 may be removed from base 240. Thus, if three or four bridges 279 are used to support post 260, the user must destroy more bridges 279 before removing head 242. To facilitate the destruction of bridges 279, each bridge 279 defines an area of reduced thickness 281 where the user may destroy bridge 279 with a pair of common household scissors.

Figure 11:
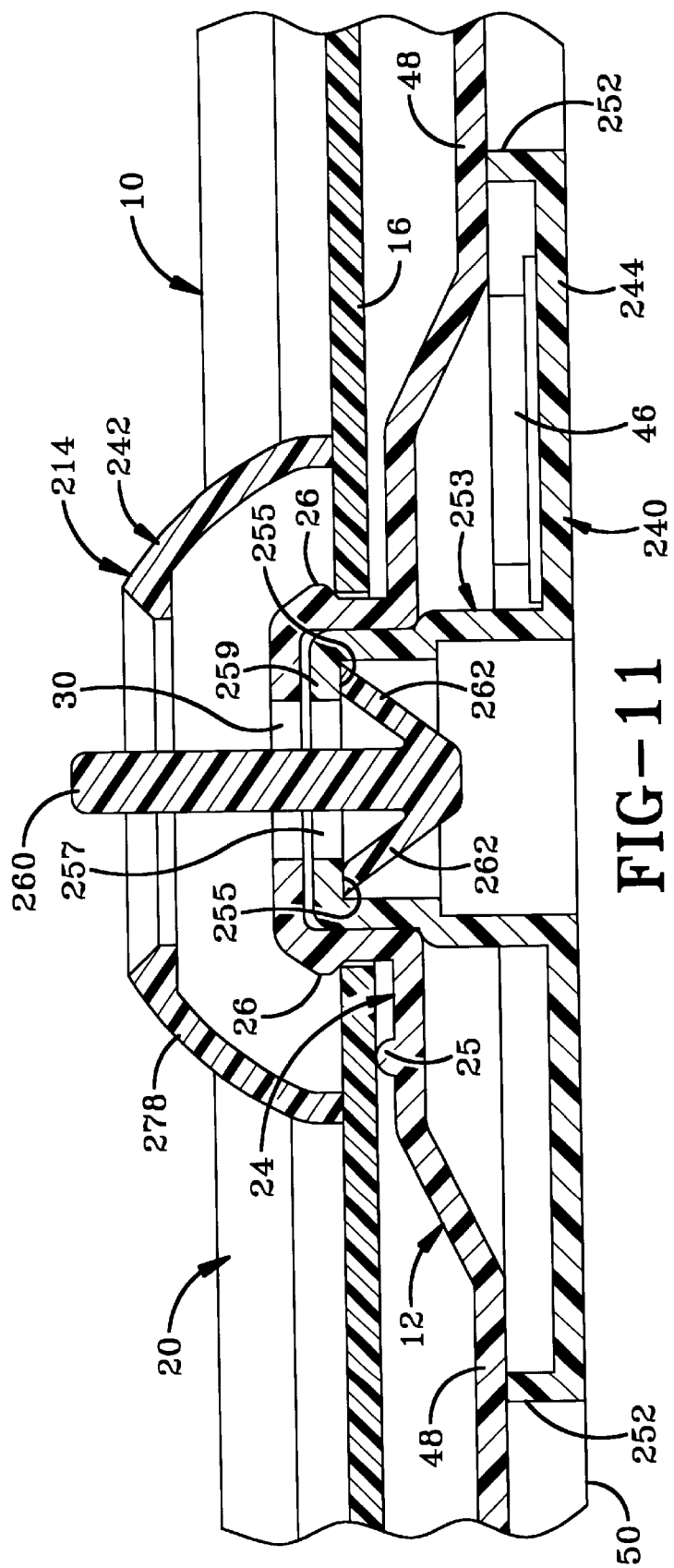
FIG. 11 is a sectional view taken along line 11—11 of FIG. 10.

Outer wall 278 is dome-shaped providing head 242 with sufficient strength to resist a shoplifter's attacks. Outer wall 278 has an inner diameter large enough to cover the portion of hub 12 that protrudes through the upper surface of disc 16 as depicted in FIG. 11.

Figure 12:
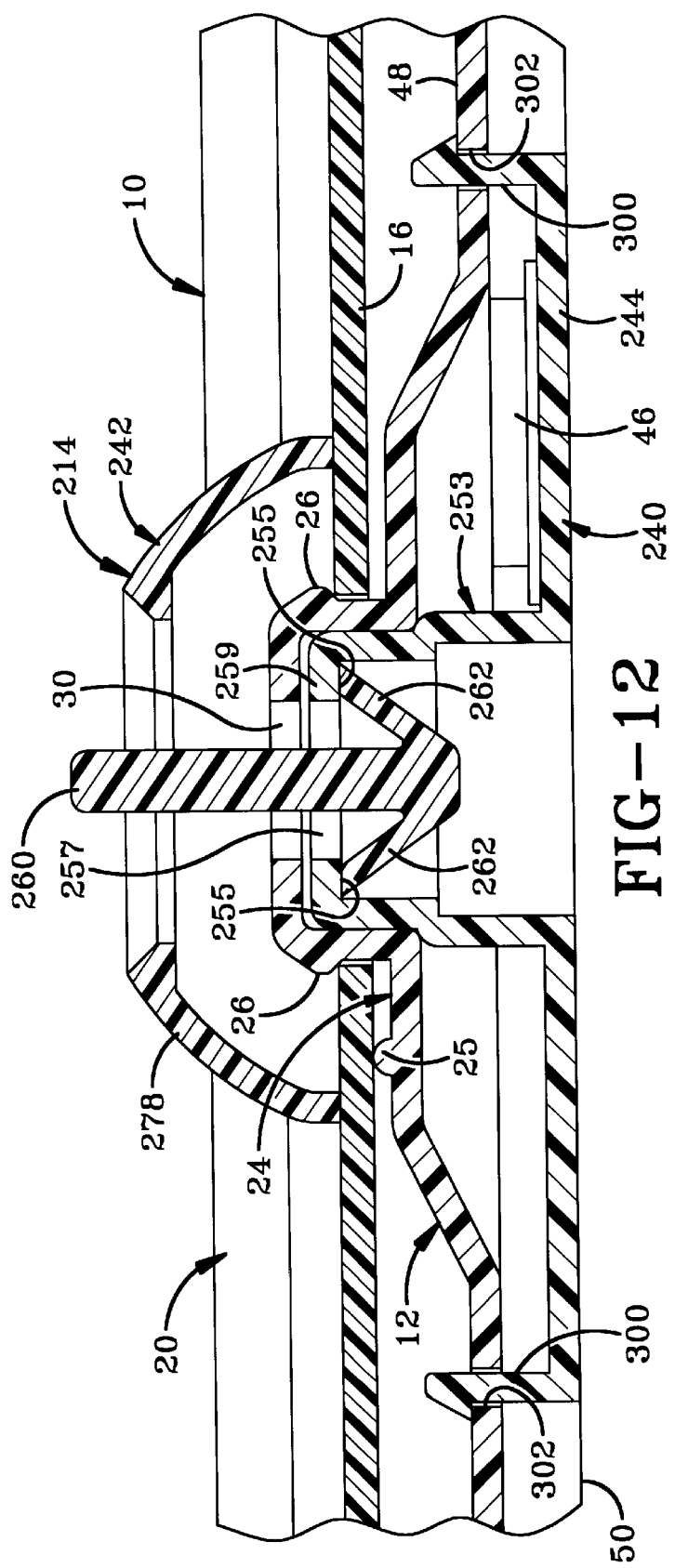
FIG. 12 is a view similar to FIG. 11 showing an alternative embodiment of the invention.

An alternative version of base 240 is depicted in FIG. 12 wherein base 240 includes locking fingers 300 designed to connect base 240 to bottom wall 48 of base 20. Bottom wall defines openings 302 configured to receive locking fingers 300 in a one-way snap fit connection.

Figure 13:
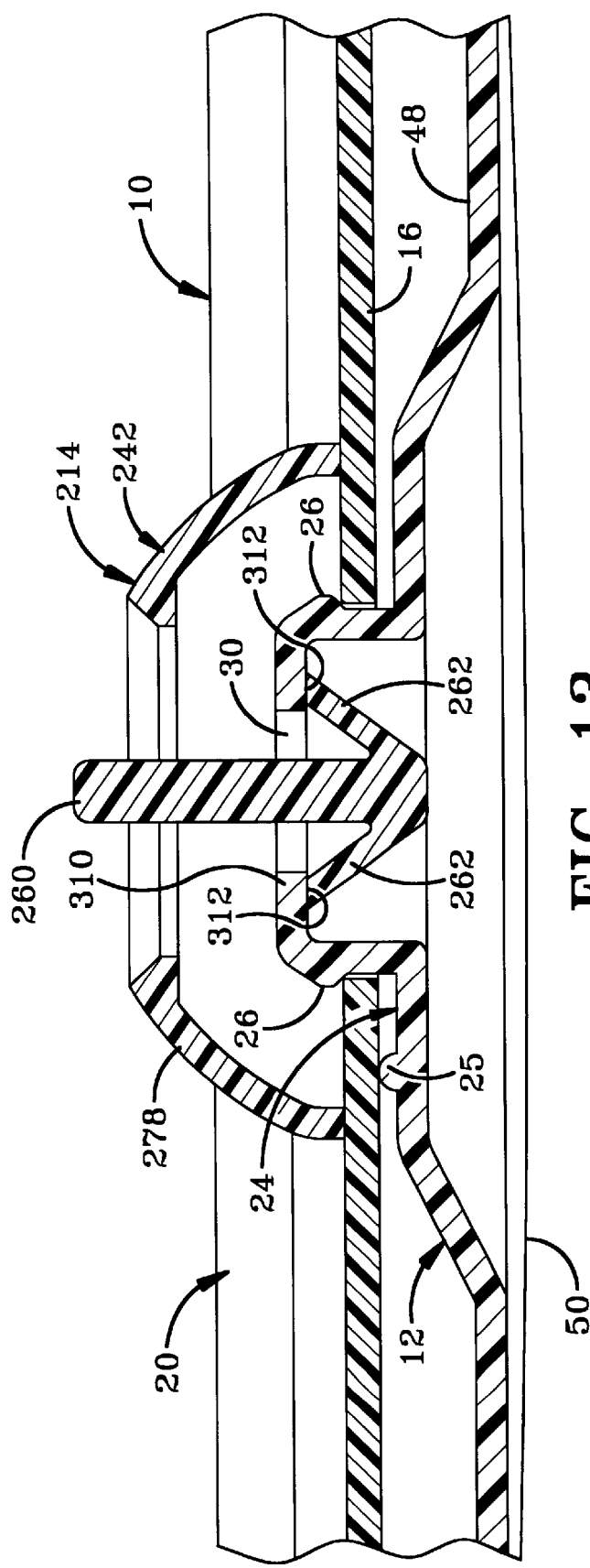
FIG. 13 is a view similar to FIG. 11 showing an alternative embodiment of the invention.

FIG. 13 depicts an alternative embodiment wherein the upper wall 310 of hub 12 is used to define a ledge 312 on which locking fingers 262 engage. In this embodiment, base 240 is not required and head 242 locks directly to hub 12.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A locking device for a disc-retaining hub; the disc-retaining hub being configured to retain a disc-shaped item of recorded media; the locking device comprising:
    a base;
    a head configured to lock to the base;
    the head having an outer wall and a post connected to the outer wall with at least one bridge; the bridge being adapted to be severed by the user to unlock the locking device;
    one of the base and head adapted to pass through the disc-retaining hub to lock the base and head to the disc-retaining hub; and
    the head being configured to prevent a disc from being removed from the disc-retaining hub when the head is locked to the base.

2. The device of claim 1, wherein the base includes a tray adapted to carry an EAS tag.

3. The device of claim 1, wherein the post is adapted to extend through the disc-retaining hub; the post including a locking finger configured to lock with the base.

4. In combination, a disc locking device and a disc-retaining hub;
    the disc-retaining hub adapted to hold a disc-shaped item of recorded media on the hub in a manner that allows a consumer to remove the disc from the hub and replace the disc on the hub; and
    the disc locking device including a locking device base and a locking device head; the locking device base and locking device head configured to lock together and cooperate with the disc-retaining hub to prevent the disc from being removed from the disc-retaining hub when the base and head of the disc locking device are locked together;
    the disc retaining hub being connected to a base adapted to receive the disc-shaped item of recorded media;
    a lid hingedly connected to the base and moveable between open and closed positions; the base and lid defining a storage compartment when the lid is in the closed position; the storage compartment adapted to receive the disc-shaped item of recorded media while the disc-shaped item of recorded media is held by the disc retaining hub; and
    the lid being moveable between the open and closed positions when the base and head of the disc locking device are locked together on the disc retaining hub.

5. The combination of claim 4, wherein one of the base and head of the disc locking device passes through a portion of the disc retaining hub.

6. The combination of claim 5, wherein the head includes a post that extends through the disc retaining hub; the post lockingly engaging the locking device base.

7. The combination of claim 4, wherein the locking device bace includes a tray adapted to carry an EAS tag.

8. In combination, a disc locking device and a disc retaining hub;
    the disc retaining hub adapted to hold a disc-shaped item of recorded media on the hub in a manner that allows a consumer to remove the disc from the hub and replace the disc on the hub;
    the disc locking device including a base and a head; the base and head configured to lock together and cooperate with the disc retaining hub to prevent the disc from being removed from the disc retaining hub when the base and head of the disc locking device are locked together; and
    the head including an outer wall and a post connected to the outer wall with at least one bridge; the post including a locking finger that engages the base.

9. The combination of claim 8, wherein the post is connected to the outer wall by a pair of bridges.

10. The combination of claim 8, wherein the post includes a pair of resilient locking fingers.

11. The combination of claim 8, wherein the base includes a tray adapted to carry an EAS tag.

12. The combination of claim 8, wherein one of the base and head of the disc locking device passes through a portion of the disc retaining hub.

13. The combination of claim 8, wherein the base of the disc locking device frictionally engages the disc retaining hub.

14. The combination of claim 8, wherein the disc retaining hub is supported by a bottom wall; the base of the disc locking device being snap-fit to the bottom wall.

15. In combination, a disc locking device and a disc-retaining hub;
    the disc-retaining hub adapted to hold a disc-shaped item of recorded media on the hub in a manner that allows a consumer to remove the disc from the hub and replace the disc on the hub;
    the disc retaining hub including a support surface and a protrusion spaced from the support surface; the support surface being positioned to be disposed below the disc-shaped item a of recorded media when the disc-shaped item of recorded media is disposed on the disc retaining hub; the protrusion adapted to be disposed above the disc-shaped item of recorded media when the disc-shaped item of recorded media is disposed on the hub; and
    the disc locking device including a locking device base and a locking device head configured to lock together and cooperate with the disc-retaining hub to prevent the disc from being removed from the disc-retaining hub when the disc locking device is locked to the disc-retaining hub.

16. The combination of claim 15, wherein the disc-retaining hub defines an opening; the disc locking device including a post that extends into the opening; the post including a locking finger that lockingly engages the disc-retaining hub.

17. The combination of claim 15, wherein the disc retaining hub is adapted to loosely hold the disc-shaped item of recorded media on the hub.

18. The combination of claim 17, wherein the disc locking device is adapted to loosely hold the disc-shaped item of recorded media on the hub when the disc locking device is locked.

* * * * *